(12) United States Patent
Ikuta

(10) Patent No.: US 7,017,305 B2
(45) Date of Patent: Mar. 28, 2006

(54) WEATHER STRIP

(75) Inventor: Kenichi Ikuta, Chiba (JP)

(73) Assignee: Kinugawa Rubber Ind. Co., Ltd., Chiba (JP)

(*) Notice: Subject to any disclaimer, the term of this patent is extended or adjusted under 35 U.S.C. 154(b) by 0 days.

(21) Appl. No.: 09/958,693

(22) PCT Filed: Mar. 22, 2001

(86) PCT No.: PCT/JP01/02258
§ 371 (c)(1),
(2), (4) Date: Oct. 10, 2001

(87) PCT Pub. No.: WO01/70540
PCT Pub. Date: Sep. 27, 2001

(65) Prior Publication Data
US 2002/0136850 A1 Sep. 26, 2002

(30) Foreign Application Priority Data
Mar. 22, 2000 (JP) .......................... 2000-079419

(51) Int. Cl.
E06B 7/22 (2006.01)

(52) U.S. Cl. .................... 49/498.1; 49/490.1

(58) Field of Classification Search ............. 49/490.1, 49/498.1, 475.1, 495.1
See application file for complete search history.

(56) References Cited

U.S. PATENT DOCUMENTS

| 4,986,947 | A | 1/1991 | Shigeki et al. ............ 264/250 |
| 5,020,277 | A | 6/1991 | Hellriegel |

FOREIGN PATENT DOCUMENTS

| EP | 0 687 839 A1 | 12/1995 |
| JP | 4-19057 | 3/1992 |
| JP | 4-110645 | 9/1992 |
| JP | 4-254231 | 9/1992 |
| JP | 5-58389 | 8/1993 |
| JP | 8-5073 | 2/1996 |
| JP | 9-136542 | 5/1997 |
| JP | 10-278696 | 10/1998 |
| JP | 11-342746 A | 12/1999 |
| JP | 2000-38034 | 2/2000 |

Primary Examiner—Jerry Redman
(74) Attorney, Agent, or Firm—Foley & Lardner LLP

(57) ABSTRACT

In a weather strip fitted to a body opening section, a bulkhead between a seal hollow chamber and a hollow chamber is so configured as to form an opening angle not smaller than right angle toward an outside of the body opening section constantly in each section, relative to a load input direction when a door panel is closed. The hollow section is constantly assumes an approximately the same deflection, irrespective of the input direction when the door panel is closed.

14 Claims, 7 Drawing Sheets

WEATHER STRIP

TECHNICAL FIELD

The present invention relates to a weather strip fitted to a body opening section of a motor vehicle.

BACKGROUND TECHNIQUE

As a weather strip fitted to a body flange 3 on a periphery of body opening sections 2 and 2a of a motor vehicle 1 as is seen in FIG. 1, a weather strip 4 as is seen in FIG. 2 is used on occasions. This weather strip 4 is of a type coupling a fitting base section (welt) 5 integrally with a hollow section (strip) 6. The fitting base section 5 sandwiches a body flange 3. The hollow section 6 has a cross section shaped approximately into numeral 8, and is constituted of a abutting section 7 which is formed with a seal hollow chamber 7a, and a middle section 8 which is integrated with the abutting section 7 and is provided with a hollow chamber 8a.

The fitting base section 5 has a core material 9, and is shaped approximately into U. The fitting base section 5 has an internal surface which is formed with flange-sandwiching lips 10, and an external surface which is formed with an ornament lip 11. The hollow section 6 is made of a comparatively soft elastic body such as a sponge rubber, a soft thermoplastic elastomer or the like. The fitting base section 5 is made of a comparatively hard material such as a solid rubber, a hard thermoplastic elastomer or the like. When the weather strip 4 is fitted to the body flange 3, the flange-sandwiching lips 10 sandwich a flange. Under the fitting condition, the ornament lip 11 is a section that contacts a garnish.

However, according to the weather strip 4 as described above, deflection of the hollow section 6 in fitting sections indicated by A to I of the body opening sections 2 and 2a varies with an input direction F (F1, F2, F3 and F4) of a seal surface 12a of a door panel 12, as is seen in FIG. 3 and FIG. 4.

Namely, as is seen in FIG. 3, in fitting sections C, G, A, E, B and F, the input (F1, F2 and F3) is applied in such a manner as to push the hollow section 6 toward an outside of the periphery of the body opening sections 2 and 2a. On the other hand, as is seen in FIG. 4, in a fitting section D on a front side of a center pillar 1a, in a fitting section I on a front side of a rear pillar 1b, and in a fitting section H below the rear pillar 1b, the input (F4) is applied in such a manner as to push the hollow section 6 toward the fitting base section 5.

Thereby, in view of an entire circumference of the body opening sections 2 and 2a, the hollow section 6 is twisted and thereby is not constant in shape (of deflection), especially, in an area where the fitting sections D, I and H change to other sections. Thereby, failures occur such as lines so generated as to increase wind noise, water tightness decreased, and external appearance deteriorated. Above all, the above phenomena notably appear at an upper corner on the front side of the center pillar 1a of the body opening section 2.

Whereupon, in view of the above circumstances, the present invention provides such a weather strip as to allow the hollow section 6 to assume an approximately the same shape (of deflection) in each section, irrespective of the input direction of the seal surface 12a when the door panel 12 is closed.

DISCLOSURE OF THE INVENTION

Under the present invention, in a weather strip forming a hollow section and a fitting base section which is fitted to a body opening section, the hollow section being provided with a seal hollow chamber integrated with a hollow chamber, a seal surface of a door panel abutting on a side defining the seal hollow chamber, the weather strip sealing a gap between the body opening section and the door panel, a bulkhead between the seal hollow chamber and the hollow chamber is so configured as to form an opening angle not smaller than right angle toward an outside of the body opening section constantly in each section on a periphery of the body opening section, relative to an input direction of the seal surface of the door panel toward the seal hollow chamber of the weather strip in each section on the periphery of the body opening section.

In each section, an extended line of the bulkhead in the cross sectional direction turns from the outside of the body opening section toward an inside of a vehicular body with a load inputted into the weather strip when the door panel is closed. As a result, the seal hollow chamber is partially pushed in such a manner as to protrude between the door panel and an outside of the periphery of the body opening section.

Thereby, deflection at the corner of the door panel becomes uniform and constant with the other sections. Therefore, bend lines are prevented, seal reactive force is stabilized, wind noise is prevented, decrease in water tightness is prevented, and deterioration of closing the door panel is prevented.

BEST MODE FOR CARRYING OUT THE INVENTION

Figure 1:
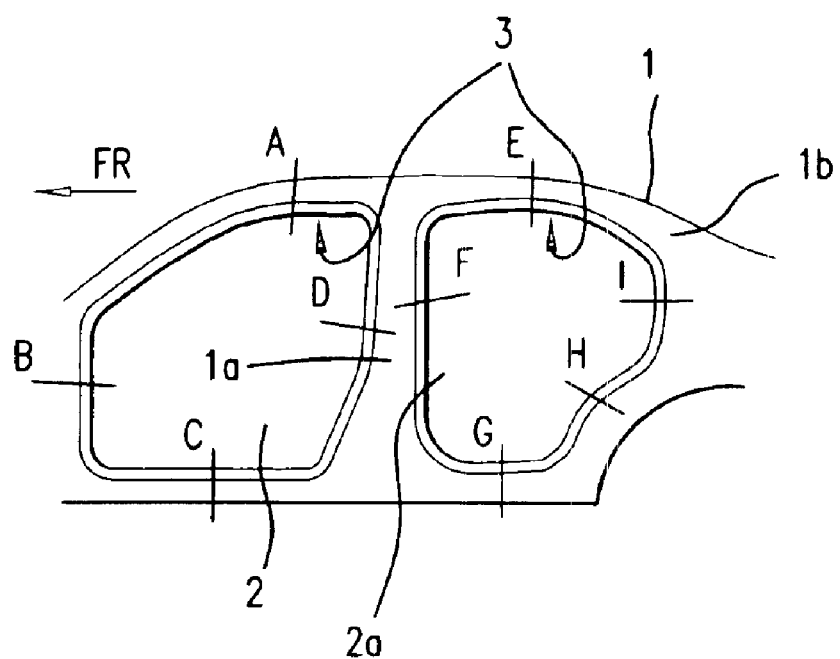
FIG. 1 is a side view of a motor vehicle partially omitted, showing fitting sections for fitting a weather strip.
Figure 2:
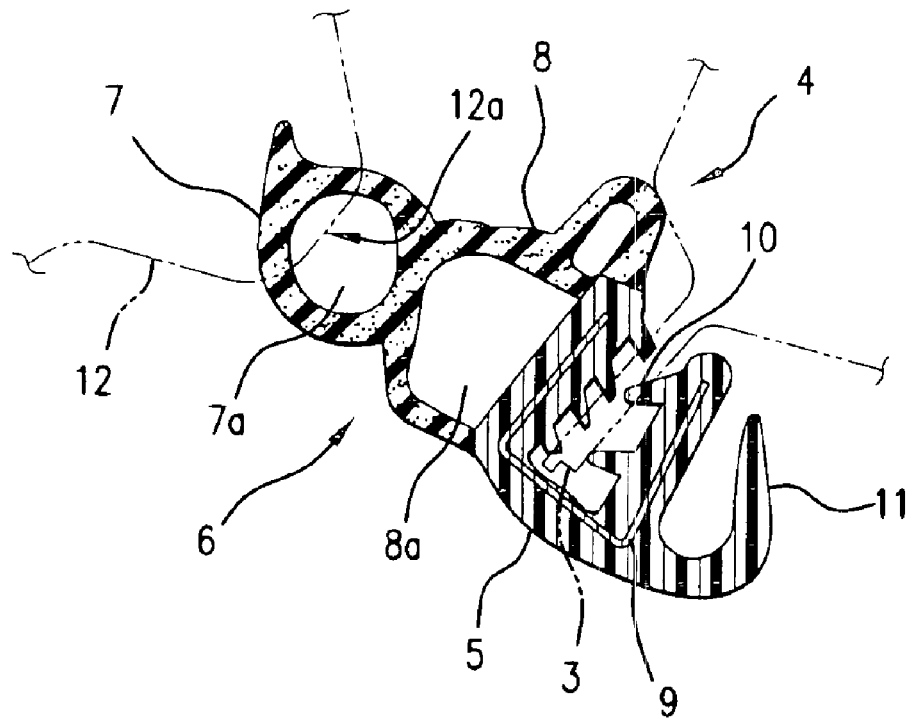
FIG. 2 shows a cross section of a conventional weather strip.
Figure 3:
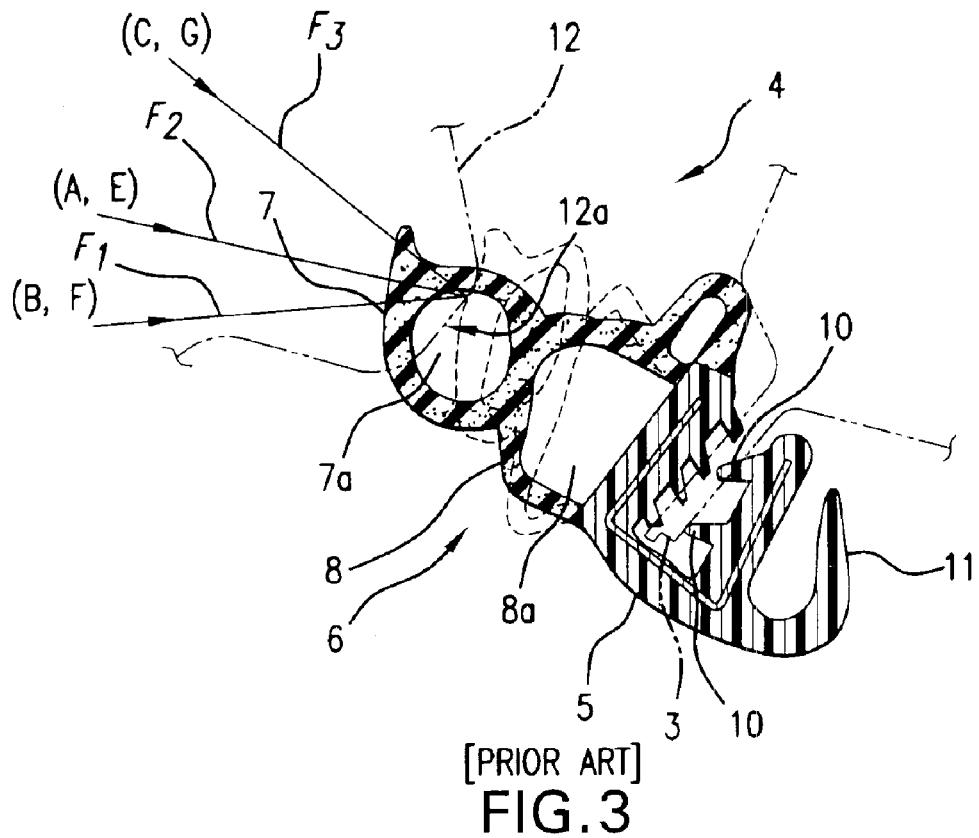
FIG. 3 shows a drawing for explaining an operation of the conventional weather strip in fitting sections C, G, A, E, B and F.
Figure 4:
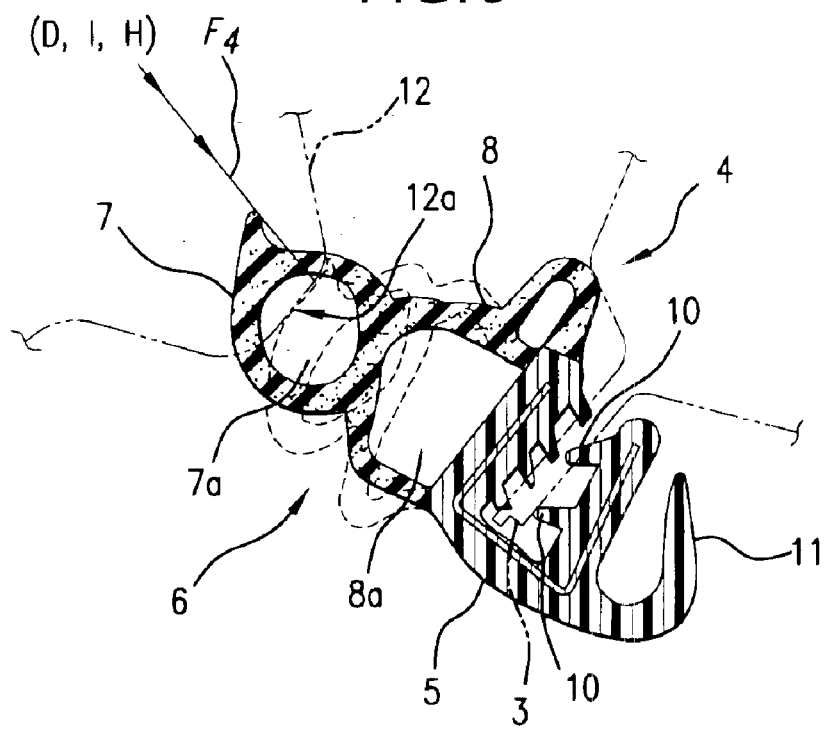
FIG. 4 shows a drawing for explaining the operation of the conventional weather strip in fitting sections D, I and H.
Figure 5:
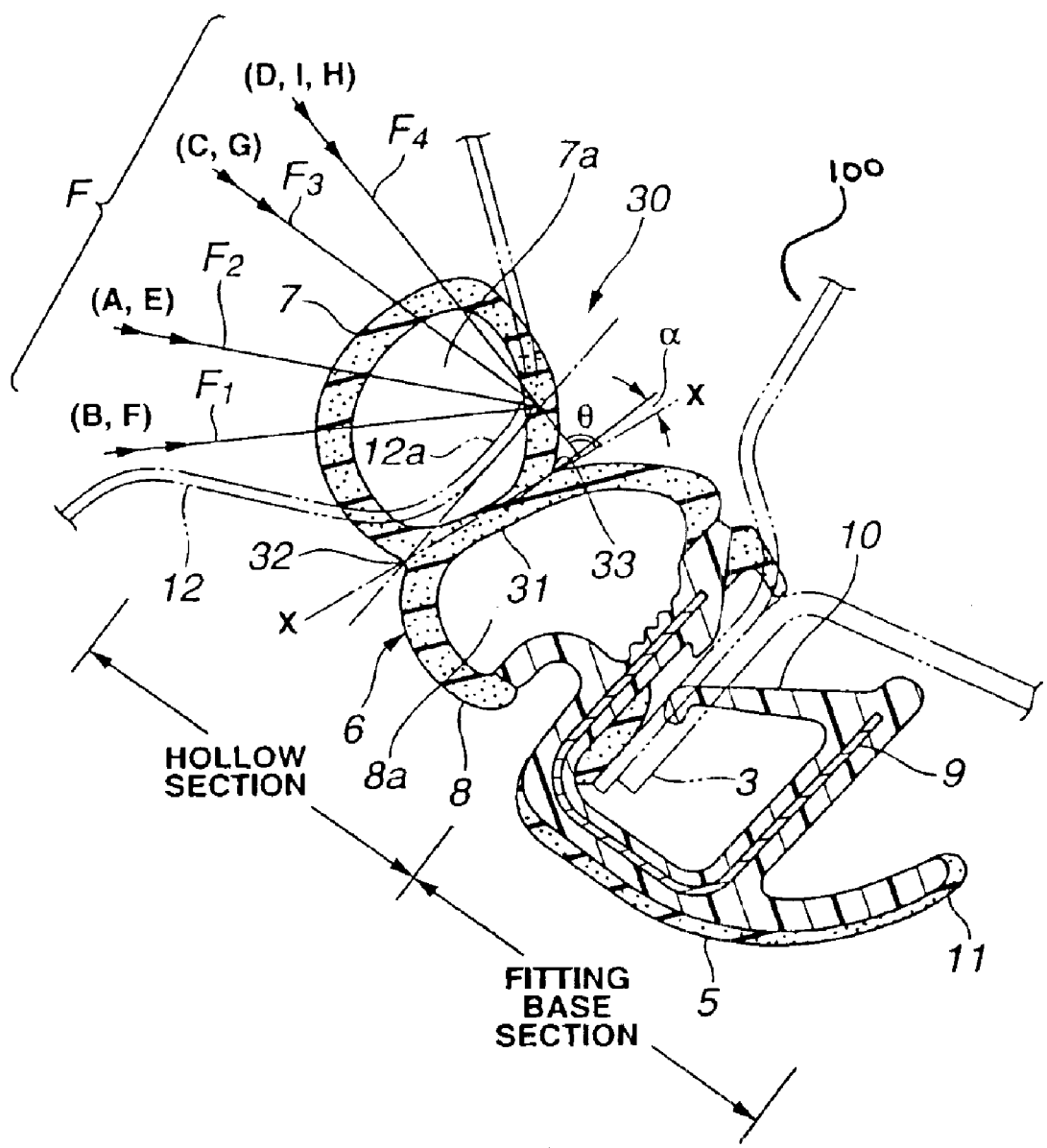
FIG. 5 shows a drawing for explaining a fundamental constitution (first example) of the present invention.

Hereinafter explained based on drawings are examples of the present invention. As is seen in FIG. 5, a weather strip 30 of the present invention is provided with a fitting base section 5 having the same constitution as that of the above conventional example, and provided with a hollow section 6 having a constitution new over that of the above conventional example. Namely, a bulkhead 31 of the hollow section 6 or a line X—X forms right angle or right angle plus an angle cc, relative to an input direction (F4) corresponding to fitting sections D, I, and H. The bulkhead 31 partitions the hollow section 6 into a abutting section 7 and a middle section 8. The line X—X runs from an inside neck section 32 to an outside neck section 33. The inside neck section 32 of the hollow section 6 is disposed on an inside of a periphery of a body opening section, while the outside neck section 33 of the hollow section 6 is disposed on an outside of the periphery of the body opening section. An input direction (F1, F2 and F3) toward the weather strip 30 corresponding to fitting sections C, G, A, E, B and F forms an angle (θ), relative to the bulk head 31. The angle (θ) is greater than right angle. Reference numeral 100 refers to the member depicted in each of FIGS. 5. 6. 8 and 9. As can be seen in each of these figures, member 100 is disposed on the periphery of the body opening section (2. 2a) and is opposed to the door panel (12).

Figure 6:
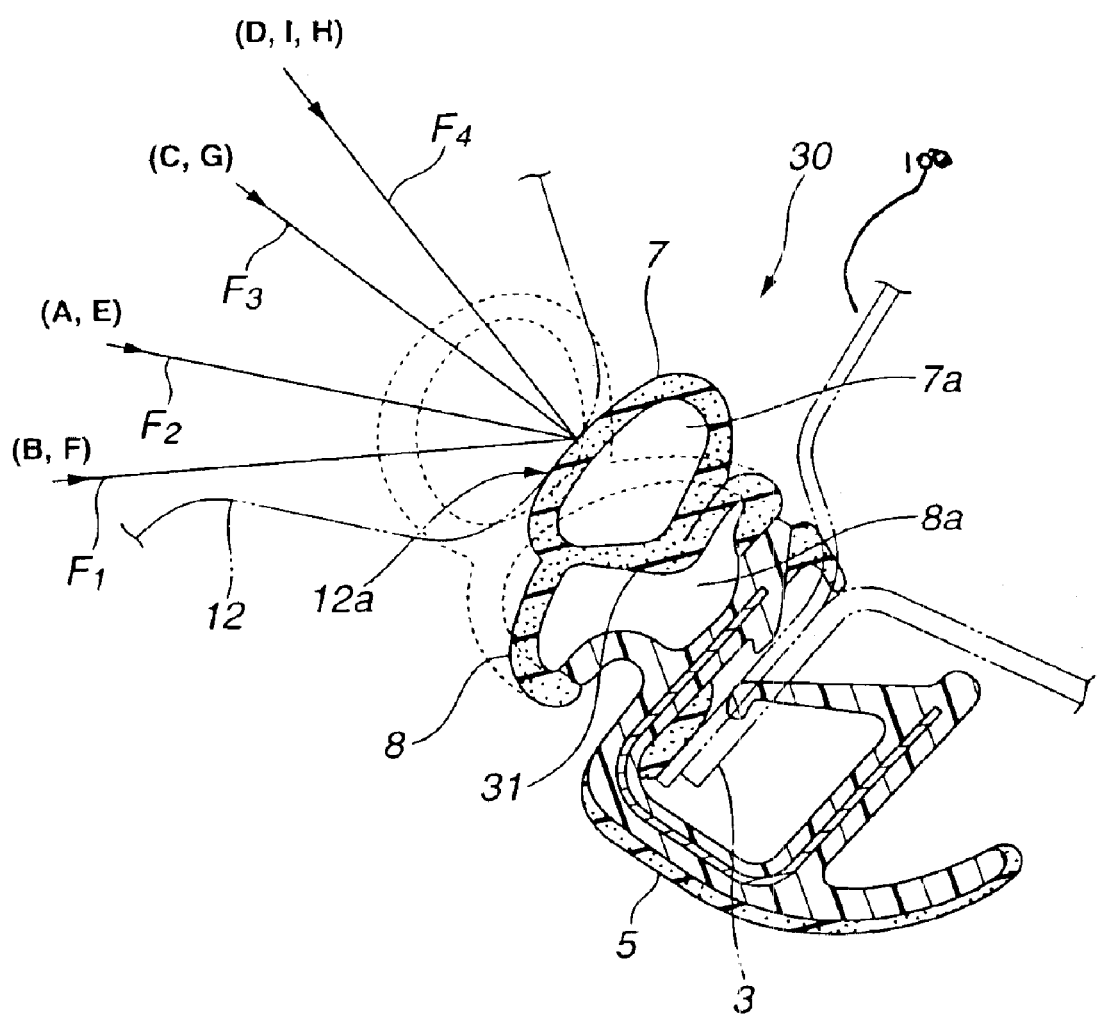
FIG. 6 shows a drawing for explaining an operation of the fundamental constitution of the present invention.

In the input direction (F4) corresponding to the fitting section D on a front side of a center pillar (1a), the fitting section I on a front side of a rear pillar (1b) and the fitting section H below the rear pillar 1b, an extended line of the bulkhead 31 turns toward an inside of a vehicular body in the clockwise direction around the inside neck section 32 on the inside of the periphery of the body opening section. As a result, the hollow section 6 formed as described above allows a seal hollow chamber 7a to be partially pushed in such a condition that the seal hollow chamber 7a protrudes between a door panel 12 and the outside of the periphery of a body opening section, as is seen in FIG. 6. Moreover, in the input directions (F1, F2 and F3) corresponding to the other fitting sections C, G, A, E, B and F, the seal hollow chamber 7a assumes the same deformation, as a matter of course. Thereby, the weather strip 30 assumes the same deflection constantly, irrespective of the input direction when the door panel 12 is closed.

Figure 7:
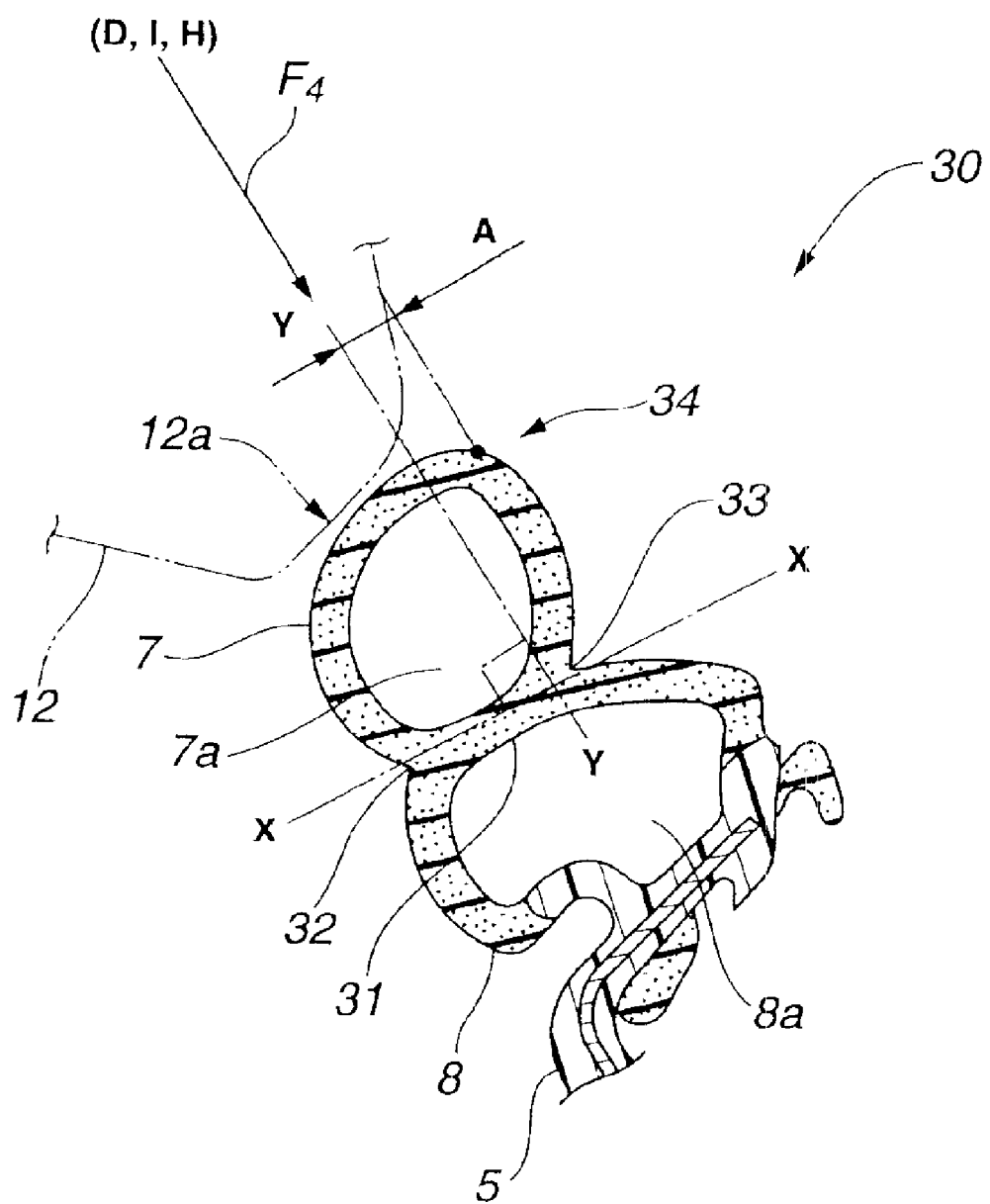
FIG. 7 shows a drawing for explaining a constitution of the weather strip according to a second example of the present invention.

In order to encourage and accelerate inclination of the abutting section 7 toward the outside of the periphery of the body opening sections 2 and 2a in the input direction (F4) corresponding to the fitting sections D, I and H, a top section 34 of the abutting section 7 of the hollow section 6 is disposed equal to an input line Y—Y (A=0) or outside the input line Y—Y (outside the periphery of the body opening sections 2 and 2a, A>0), as is seen in FIG. 7. In this case, the bulkhead 31 is inclined as described above. The input line Y—Y is a line on which a seal surface 12a of the door panel in the fitting sections D, I and H proceeds into the weather strip, and the input line Y—Y is disposed most outside on the periphery of the body opening section. Namely, the seal hollow chamber 7a is formed with the top section 34 which becomes a bend point of deflection when the door panel is closed. When the door panel is closed; on the front side of the center pillar, on the front side of the rear pillar and below the rear pillar, the top section 34 is disposed on the input line Y—Y (which is disposed most outside on the periphery of the body opening section) or disposed in such a manner as to be deflected more outward than the input line Y—Y on the periphery of the body opening section.

Thereby, the abutting section 7 is likely to be inclined toward the outside of the periphery of the body opening sections 2 and 2a, in the input direction (F4) corresponding to the fitting sections D, I and H. In the input directions (F1, F2 and F3) corresponding to the other fitting sections C, G, A, E, B and F, the abutting section 7 assumes the same deformation, as a matter of course. Thereby, the weather strip 30 assumes the same deflection constantly, irrespective of the input direction when the door panel 12 is closed.

Figure 8:
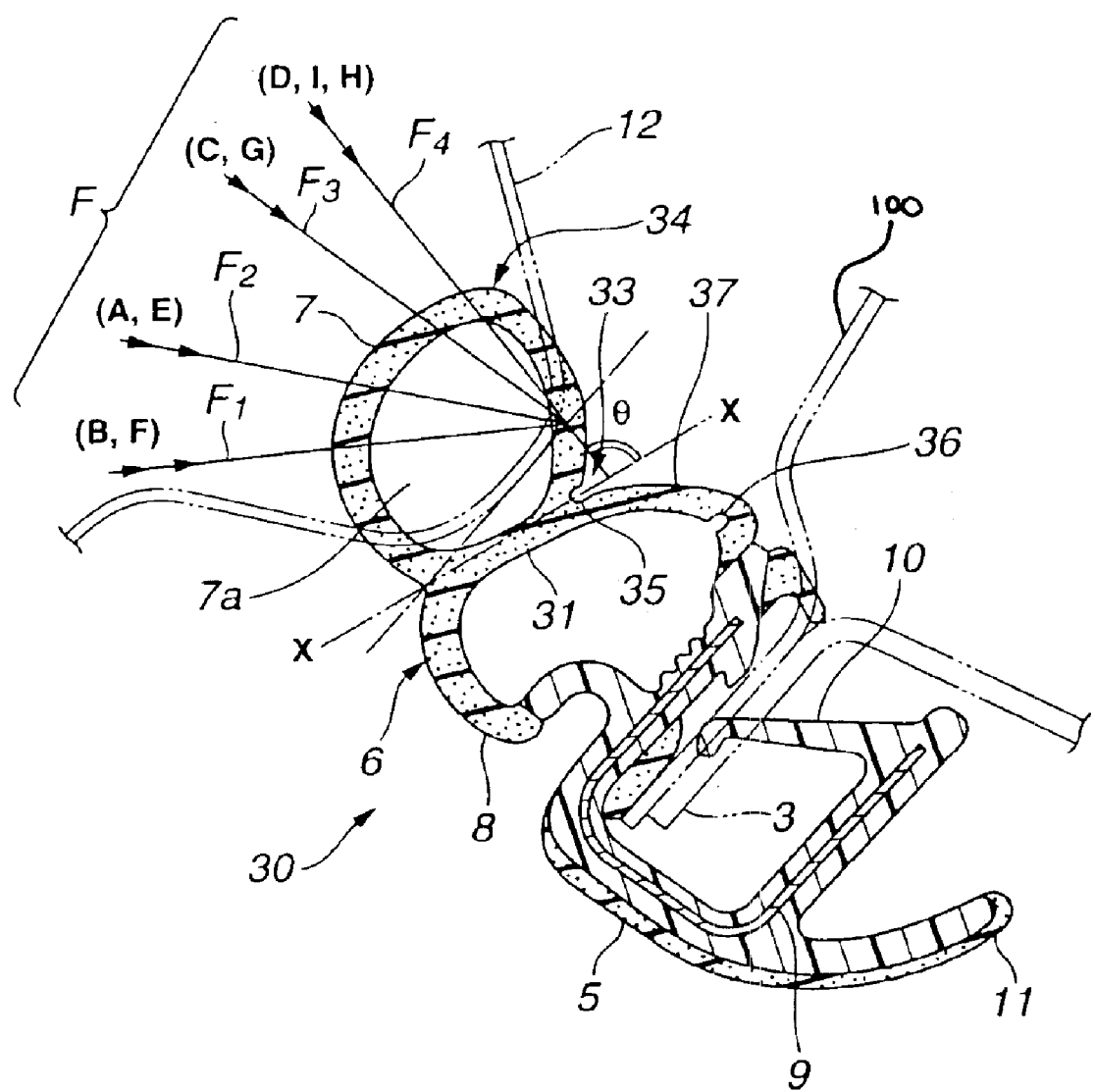
FIG. 8 shows a cross section of the weather strip, according to the second example added by a third example of the present invention.

Furthermore, under the condition that the bulkhead 31 is inclined as described above, as is seen in FIG. 8, the outside neck section 33 of the weather strip 30 outside the periphery of the body opening section is formed with a notch section 35. The notch section 35 is disposed at one end of a bridge section 37 which has the other end defining an internal surface formed with a notch portion 36. With the thus formed notch sections 35 and 36, the bridge section 37 is more deformable than the other sections, via the notch sections 35 and 36, in the input direction (F4) corresponding to the fitting sections D, I and H. The extended line of the bulkhead 31 turns toward the inside of the vehicular body in the clockwise direction around the inside neck section 32 inside the periphery of the body opening section. Thereby, the abutting section 7 is likely to be inclined toward the outside of the periphery of the body opening sections 2 and 2a. In the input directions corresponding to the other fitting sections C, G, A, E, B and F, the abutting section 7 assumes the same deformation, as a matter of course.

Figure 9:
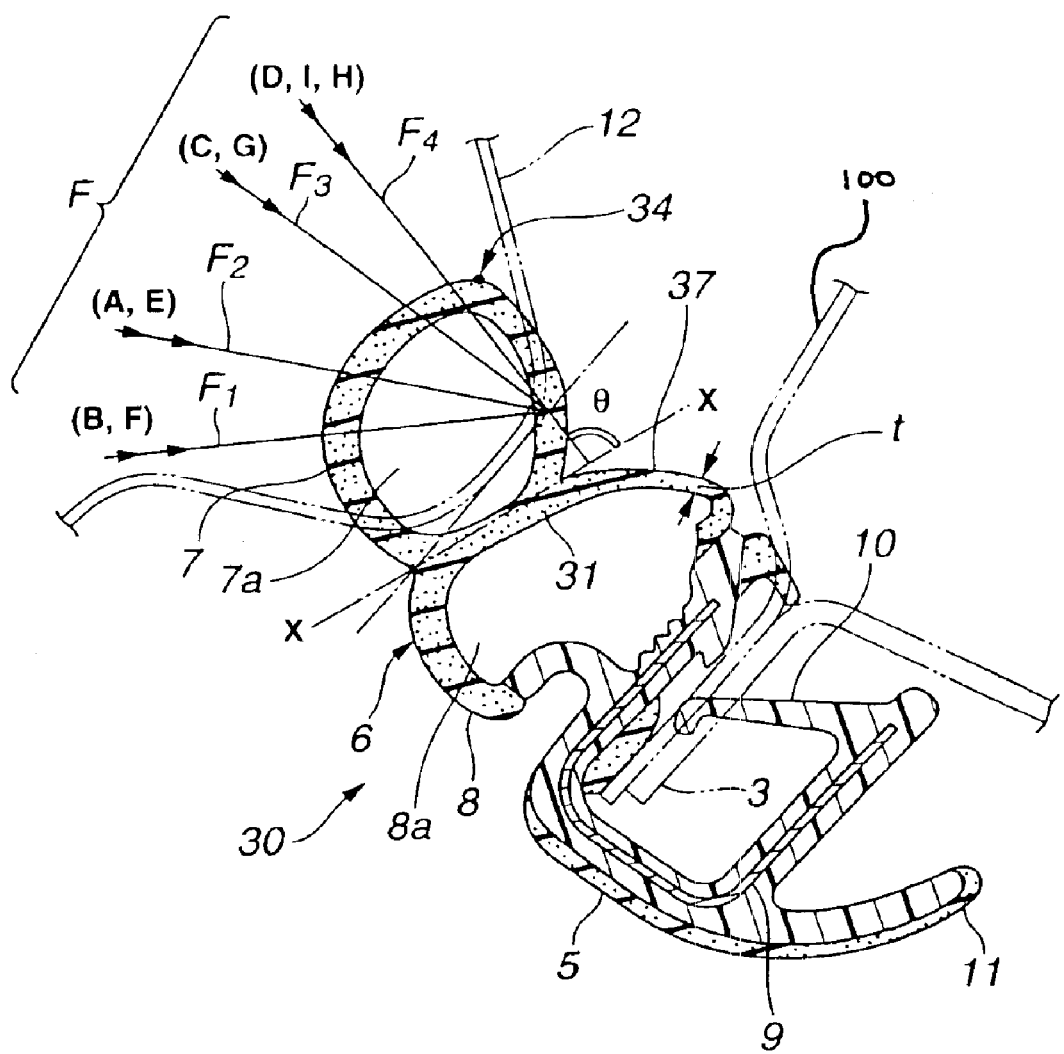
FIG. 9 shows a cross section of the weather strip, according to the second example added by a fourth example of the present invention.

Still furthermore, under the condition that the bulkhead 31 is inclined as described above, as is seen in FIG. 9, the bridge section 37 has a thickness t which is smaller than a thickness of the other sections of the hollow chamber 8a. With this, the bridge section 37 is more deformable than the other sections in the input direction (F4) corresponding to the fitting sections D, I and H. The extended line of the bulkhead 31 turns toward the inside of the vehicular body in the clockwise direction around the inside neck section 32 inside the periphery of the body opening section. Thereby, the abutting section 7 is likely to be inclined toward the outside of the periphery of the body opening sections 2 and 2a. In the input directions corresponding to the other fitting sections C, G, A, E, B and F, the abutting section 7 assumes the same deformation, as a matter of course.

The above summarizes that the deformation in the input direction (F4) corresponding to the fitting sections D, I and H is assuredly formed approximately equal to the deformation in the input directions (F1, F2 and F3) corresponding to the fitting sections C, G, A, E, B and F, through the following first doing added by the following second doing, third doing or fourth doing. First doing: Allowing the bulkhead 31 to form right angle or the angle (θ) (θ: greater than right angle) relative to the opening-closing direction F of the door panel 12, which bulkhead 31 partitions the hollow section 6 of the weather strip 30 into the abutting section 7 and the middle section 8. Second doing: Allowing the top section 34 of the abutting section 7 to be disposed equal to the input line Y—Y (A=0) or outside the input line Y—Y (outside the periphery of the body opening sections 2 and 2a, A>0), the input line Y—Y being the line on which the seal surface 12a of the door panel in the fitting sections D, I and H proceeds into the weather strip, and the input line Y—Y being disposed most outside on the periphery of the body opening section. Third doing: Allowing the bridge section 37 to be formed with the notch sections 35 and 36 at each end of the bridge section 37. Fourth doing: Allowing the bridge section 37 to have the thickness t which is smaller than the thickness of the other sections of the hollow chamber 8a. Therefore, the above allows the deflection to be constant in any sections of the weather strip 30.

What is claimed is:

1. A weather strip forming a hollow section and a fitting base section which is fitted to a body opening section, the hollow section being provided with a seal hollow chamber integrated with a hollow chamber, a seal surface of a door panel abutting on a side defining the seal hollow chamber, the weather strip sealing a gap between the body opening section and the door panel, wherein the weather strip comprises a bulkhead between the seal hollow chamber and the hollow chamber, wherein, along the entire periphery of the body opening section, an angle formed at the intersection of (i) a load input into the weather strip by the door and (ii) the bulkhead forms an opening angle not smaller than a right angle toward an outside of the body, wherein the bulkhead turns in response to the load input into the weather strip by the door, wherein the opening angle remains not smaller than a right angle along the entire periphery of the body opening section from a point of initial contact between the weather strip and the door until the door is closed, and, wherein an outer wall of the hollow section is free from an abutment on a member which is disposed on the periphery of the body opening section and is opposed to the door panel.

2. The weather strip as described in claim 1, characterized in that a top section is formed at the seal hollow chamber, the top section becoming a bend point of deflection when the door panel is closed; and that, on a front side of a center pillar, on a front side of a rear pillar, and below the rear pillar, the top section is disposed on an input line or disposed in such a manner as to be deflected more outward than the input line on the periphery of the body opening section, the input line being a line on which the seal surface of the door panel proceeds into the weather strip and the input line being disposed most outside on the periphery of the body opening section.

3. The weather strip as described in claim 1, characterized in that a notch section is formed at both ends of a bridge section which is disposed outside the periphery of the body opening section and is formed at the hollow chamber, the hollow chamber opposite to the seal hollow chamber being so disposed as to be continuous with the seal hollow chamber by way of the bulkhead.

4. In a weather strip forming a hollow section and a fitting base section which is fitted to a body opening section, the hollow section being provided with a seal hollow chamber integrated with a hollow chamber, a seal surface of a door panel abutting on a side defining the seal hollow chamber, the weather strip sealing a gap between the body opening section and the door panel, the weather strip is characterized in that a bulkhead between the seal hollow chamber and the hollow chamber is so configured as to form an opening angle not smaller than a right angle toward an outside of the body opening section constantly in each section on a periphery of the body opening section, relative to all input direction of the seal surface of the door panel toward the seal hollow chamber of the weather strip in each section on the periphery of the body opening section wherein a thickness of a bridge section is smaller than a thickness of the other sections of the hollow chamber, the bridge section being disposed outside the periphery of the body opening section and being formed at the hollow chamber, the hollow chamber opposite to the seal hollow chamber being so disposed as to be continuous with the seal hollow chamber by way of the bulkhead.

5. A weather strip forming a hollow section and a fitting base section which is fitted to a body opening section, the hollow section being provided with a seal hollow chamber integrated with a hollow chamber, a seal surface of a door panel abutting on a side defining the seal hollow chamber, the weather strip sealing a gap between the body opening section and the door panel, the weather strip is characterized in that a bulkhead between the seal hollow chamber and the hollow chamber is so configured as to form an opening angle not smaller than a right angle toward an outside of the body opening section constantly in each section on a periphery of the body opening section, relative to all input direction of the seal surface of the door panel toward the seal hollow chamber of the weather strip in each section on the periphery of the body opening section, wherein an outer wall of the hollow section is free from an abutment on a member which is disposed on the periphery of the body opening section and is opposed to the door panel;

wherein a top section is formed at the seal hollow chamber, the top section becoming a bend point of deflection when the door panel is closed;

wherein, on a front side of a center pillar, on a front side of a rear pillar, and below the rear pillar, the top section is disposed on an input line or disposed in such a manner as to be deflected more outward than the input line on the periphery of the body opening section, the input line being a line on which the seal surface of the door panel proceeds into the weather strip and the input line being disposed most outside on the periphery of the body opening section; and wherein a notch section is formed at both ends of a bridge section which is disposed outside the periphery of the body opening section and is formed at the hollow chamber, the hollow chamber opposite to the seal hollow chamber being so disposed as to be continuous with the seal hollow chamber by way of the bulkhead.

6. In a weather strip fanning a hollow section and a fitting base section which is fitted to a body opening section, the hollow section being provided with a seal hollow chamber integrated with a hollow chamber, a seal surface of a door panel abutting on a side defining the seal hollow chamber, the weather strip sealing a gap between the body opening section and the door panel, the weather strip is characterized in that a bulkhead between the seal hollow chamber and the hollow chamber is so configured as to form an opening angle not smaller than a right angle toward an outside of the body opening section constantly in each section on a periphery of the body opening section, relative to all input direction of the seal surface of the door panel toward the seal hollow chamber of the weather strip in each section on the periphery of the body opening section wherein a top section is formed at the seal hollow chamber, the top section becoming a bend point of deflection when the door panel is closed; and that, on a front side of a center pillar, on a front side of a rear pillar, and below the rear pillar, the top section is disposed on an input line or disposed in such a manner as to be deflected more outward than the input line on the periphery of the body opening section, the input line being a line on which the seal surface of the door panel proceeds into the weather strip and the input line being disposed most outside on the periphery of the body opening section and wherein a thickness of a bridge section is smaller than a thickness of the other sections of the hollow chamber, the bridge section being disposed outside the periphery of the body opening section and being formed at the hollow chamber, the hollow chamber opposite to the seal hollow chamber being so disposed as to be continuous with the seal hollow chamber by way of the bulkhead.

7. In a weather strip forming a hollow section and a fitting base section which is fitted to a body opening section, the hollow section being provided with a seal hollow chamber integrated with a hollow chamber, a seal surface of a door panel abutting on a side defining the seal hollow chamber, the weather strip sealing a gap between the body opening section and the door panel, the weather strip is characterized in that a bulkhead between the seal hollow chamber and the hollow chamber is so configured as to form an opening angle not smaller than a right angle toward an outside of the body opening section constantly in each section on a periphery of the body opening section, relative to all input direction of the seal surface of the door panel toward the seal hollow chamber of the weather strip in each section on the periphery of the body opening section wherein a notch section is formed at both ends of a bridge section which is disposed outside the periphery of the body opening section and is formed at the hollow chamber, the hollow chamber opposite to the seal hollow chamber being so disposed as to be continuous with the seal hollow chamber by way of the bulkhead and wherein a thickness of the bridge section is smaller than a thickness of the other sections of the hollow chamber, the bridge section being disposed outside the periphery of the body opening section and being formed at the hollow chamber, the hollow chamber opposite to the seal hollow chamber being so disposed as to be continuous with the seal hollow chamber by way of the bulkhead.

8. In a weather strip forming a hollow section and a fitting base section which is fitted to a body opening section, the hollow section being provided with a seal hollow chamber integrated with a hollow chamber, a seal surface of a door panel abutting on a side defining the seal hollow chamber, the weather strip sealing a gap between the body opening section and the door panel, the weather strip is characterized in that a bulkhead between the seal hollow chamber and the hollow chamber is so configured as to form an opening angle not smaller than a right angle toward an outside of the body opening section constantly in each section on a periphery of the body opening section, relative to all input direction of the seal surface of the door panel toward the seal hollow chamber of the weather strip in each section on the periphery of the body opening section wherein a top section is formed at the seal hollow chamber, the top section becoming a bend point of deflection when the door panel is closed; and that, on a front side of a center pillar, on a front side of a rear pillar, and below the rear pillar, the top section is disposed on an input line or disposed in such a manner as to be deflected more outward than the input line on the periphery of the body opening section, the input line being a line on which the seal surface of the door panel proceeds into the weather strip and the input line being disposed most outside on the periphery of the body opening section; wherein a notch section is formed at both ends of a bridge section which is disposed outside the periphery of the body opening section and is formed at the hollow chamber, the hollow chamber opposite to the seal hollow chamber being so disposed as to be continuous with the seal hollow chamber by way of the bulkhead; and wherein a thickness of a bridge section is smaller than a thickness of the other sections of the hollow chamber, the bridge section being disposed outside the periphery of the body opening section and being formed at the hollow chamber, the hollow chamber opposite to the seal hollow chamber being so disposed as to be continuous with the seal hollow chamber by way of the bulkhead.

9. A weather strip forming a hollow section and a fitting base section which is fitted to a body opening section, the hollow section comprising a seal hollow chamber integrated with a hollow chamber, a seal surface of a door panel abutting on a side defining the seal hollow chamber, the weather strip sealing a gap between the body opening section and the door panel, wherein the weather strip comprises a bulkhead between the seal hollow chamber and the hollow, wherein, alone the entire periphery of the body opening section, an angle formed at the intersection of (i) a load input into the weather strip by the door and (ii) the bulkhead forms an opening angle not smaller than a right angle toward an outside of the body, wherein the bulkhead turns in response to the load input into the weather strip by the door, wherein the opening angle remains not smaller than a right angle alone the entire periphery of the body opening section from a point of initial contact between the weather strip and the door until the door is closed, wherein a thickness of a bridge section is smaller than a thickness of the other sections of the hollow chamber, and wherein an outer wall of the hollow section is free from an abutment on a member which is disposed on the periphery of the body opening section and is opposed to the door panel.

10. A weather strip forming a hollow section and a fitting base section which is fitted to a body opening section, the hollow section comprising a seal hollow chamber integrated with a hollow chamber, a seal surface of a door panel abutting on a side defining the seal hollow chamber, the weather strip sealing a gap between the body opening section and the door panel, wherein the weather strip comprises a bulkhead between the seal hollow chamber and the hollow chamber, wherein, alone the entire periphery of the body opening section, an angle formed at the intersection of (i) a load input into the weather strip by the door and (ii) the bulkhead forms an opening angle not smaller than a right angle toward an outside of the body, wherein the bulkhead turns in response to the load input into the weather strip by the door, wherein the opening angle remains not smaller than a right angle alone the entire periphery of the body opening section from a point of initial contact between the weather strip and the door until the door is closed, wherein a notch section is formed at both ends of a bridge section, and wherein an outer wall of the hollow section is free from an abutment on a member which is disposed on the periphery of the body opening section and is opposed to the door panel.

11. A weather strip for sealing a gap between a door panel and a body opening section of a motor vehicle, the weather strip including:
   a fitting base section fitted on a periphery of the body opening section; and
   a hollow section having:
      a first hollow chamber formed with a side on which a seal surface of the door panel abuts;
      a second hollow chamber between the first hollow chamber and the fitting base section;
      a bulkhead disposed between the first and second hollow chambers and extending at an angle θ, with respect to every direction of load input of the seal surface of the door panel toward the first hollow chamber of the weather strip, opening toward an outside of the body opening section and being not smaller than a right angle at anywhere on the periphery of the body opening section; and
      a bridge extending between the bulkhead and the fitting base section outside of the periphery of the body opening portion and being free from abutment with a member that is disposed on the periphery of the body opening section,
   wherein a line X—X through the bulkhead turn with a load input into the weather strip as the door closes and wherein an angel θ is formed by the intersection of the direction of the load input and the line X—X, is greater than a right angle.

12. The weather strip according to claim 11, wherein the hollow section has a top point formed around the first hollow chamber in such a manner that the hollow section takes a bend in the top point upon closing of the door panel, and the top point is located on or outside the direction of load input of the seal surface of the door panel toward the weather strip on a front side of a center pillar of the vehicle, on a front side of a rear pillar of the vehicle and below the rear pillar.

13. The weather strip according to claim 11, wherein the bridge has notches formed in both ends thereof.

14. The weather strip according to claim 11, wherein the bridge is smaller in thickness than any other portion of the hollow section.

* * * * *